(12) United States Patent
Cook et al.

(10) Patent No.: US 6,248,956 B1
(45) Date of Patent: Jun. 19, 2001

(54) INSULATED ELECTRICAL EQUIPMENT

(75) Inventors: Michael Robert Cook, Tockenham; Donald Christopher Cowley Barrett, Marlborough, both of (GB); Matthew Spalding, Alpharetta; Michael Harben, Woodstock, both of GA (US)

(73) Assignees: Tyco Electronics U.K. Limited, Swindon (GB); Georgia Power Company, Atlanta, GA (US)

( * ) Notice: Subject to any disclaimer, the term of this patent is extended or adjusted under 35 U.S.C. 154(b) by 0 days.

(21) Appl. No.: 09/142,668

(22) PCT Filed: Mar. 11, 1997

(86) PCT No.: PCT/GB97/00662

§ 371 Date: Jun. 16, 1999

§ 102(e) Date: Jun. 16, 1999

(87) PCT Pub. No.: WO97/34306

PCT Pub. Date: Sep. 18, 1997

(30) Foreign Application Priority Data

Mar. 11, 1997 (GB) .................................................. 9605107

(51) Int. Cl.$^7$ .................................................. H01B 17/00
(52) U.S. Cl. .......................... 174/155; 174/156; 174/154; 174/167; 174/168
(58) Field of Search .................. 174/138 R, 140 CR, 174/154, 155, 156, 163 R, 167, 168, 172, 207, 43, 44, 40 CC, 40 R

(56) References Cited

U.S. PATENT DOCUMENTS

| 1,766,636 | 6/1930 | Holzel . | |
|---|---|---|---|
| 2,099,540 | 11/1937 | Smith | 173/28 |
| 2,234,391 | 3/1941 | Taylor | 25/156 |
| 2,617,378 | 11/1952 | Osol | 114/221 |
| 2,999,479 | 9/1961 | Carder | 119/1 |
| 3,005,436 | 10/1961 | Caldwell | 114/221 |
| 3,016,034 | * 1/1962 | Raistakka | 114/221 |
| 3,056,376 | 1/1962 | Bender | 116/23 |
| 4,053,707 | 10/1977 | Ely et al. | 174/209 |

(List continued on next page.)

FOREIGN PATENT DOCUMENTS

| 3528771 | 2/1987 | (DE) | H01B/17/14 |
|---|---|---|---|
| 0328365 A2 | 8/1989 | (EP) | H01B/17/42 |
| 2307352 | 11/1976 | (FR) | H01B/17/42 |
| 1542845 | 3/1979 | (GB) | H01B/17/42 |
| WO 92/08237 | 5/1992 | (WO) | H01B/17/42 |
| WO 96/16416 | 5/1996 | (WO) | H01B/17/50 |

OTHER PUBLICATIONS

Derwent Abstract WPI Acc. No. 93–062781 (1993) and JAPIO abstract No. 04021243 (abstracts of Chubu Elec. & Furukawa Elec., JP 05–012943 (1993).

IEEE Standard No. 1264–1993, "IEEE Guide for Animal Deterrents for Electric Power Supply Substations", Jan. 3, 1996.

Patent Abstract of Japan, vol. 13, No. 109 (E–727), Mar. 19, 1989 (abstract of Chubu Elec. Power Co., JP 63–281323 (1988).

Primary Examiner—Dean A. Reichard
Assistant Examiner—Charlie Nguyen
(74) Attorney, Agent, or Firm—Myers Bigel Sibley & Sajovec

(57) ABSTRACT

An annular guard (20) for mounting on a high voltage insulator extends laterally thereof for a sufficient distance so as to prevent small wildlife such as squirrels from forming a short circuit between the opposing ends of the insulator at high voltage and earth potential respectively. The guard (20) is formed in two planar parts (24, 26) that are pivoted together (28) so that they can be relatively rotated between an open condition for mounting onto a live insulator and a closed condition for being secured thereto. Overlapping regions of the two parts are secured together (30, 32, 34, 36, 38) in the closed condition.

20 Claims, 3 Drawing Sheets

U.S. PATENT DOCUMENTS

| | | | |
|---|---|---|---|
| 4,201,883 | 5/1980 | Shepherd | 174/139 |
| 4,243,628 | 1/1981 | Herold | 264/275 |
| 4,467,387 | 8/1984 | Bergh et al. | 361/132 |
| 4,637,164 | 1/1987 | Brown | 47/24 |
| 4,731,507 | 3/1988 | Torimoto et al. | 174/139 |
| 5,023,406 | 6/1991 | Thornley | 174/209 |
| 5,293,721 | 3/1994 | Richard et al. | 52/101 |
| 5,293,835 | 3/1994 | Shagoury | 119/57.9 |
| 5,347,769 | 9/1994 | Dinsmore | 52/101 |
| 5,446,242 | 8/1995 | Barrett | 174/140 R |
| 5,525,073 * | 6/1996 | Sampson | 439/521 |
| 5,679,922 | 10/1997 | Harben | 174/5 R |
| 5,682,015 | 10/1997 | Harben | 174/5 R |
| 6,005,196 * | 12/1999 | Spillyards | 174/138 F |

* cited by examiner

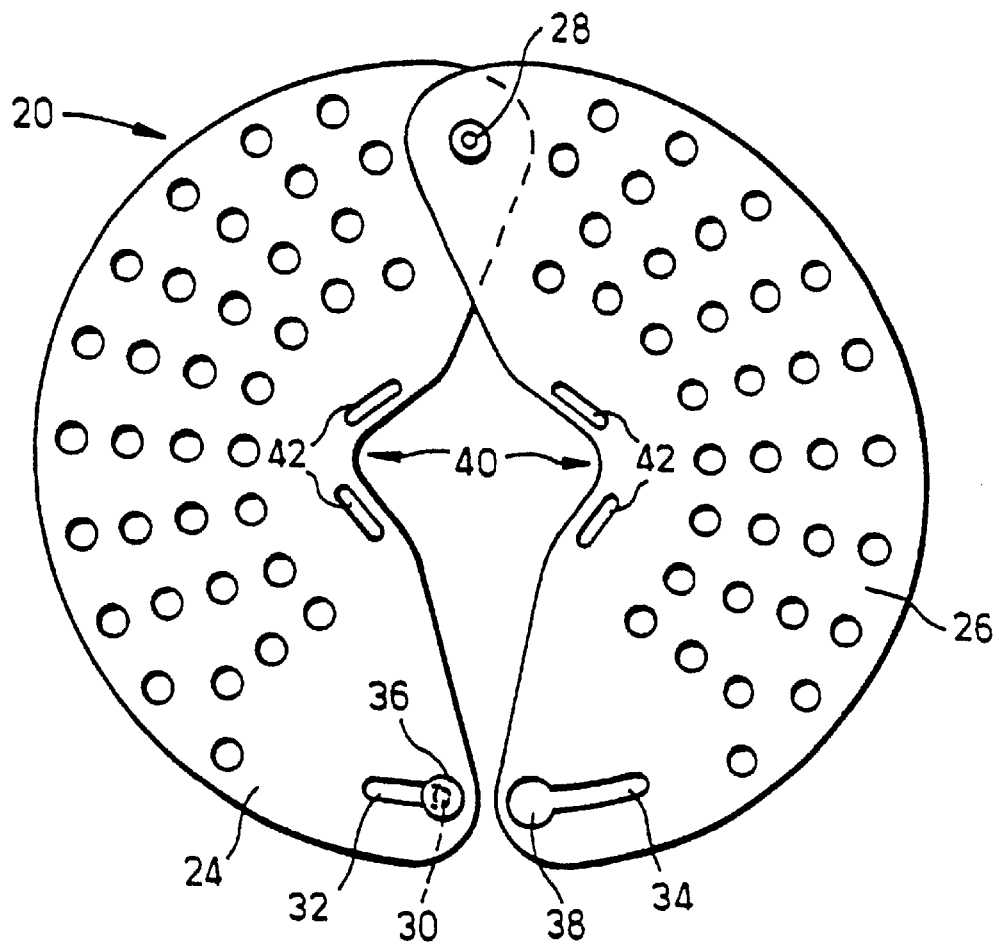
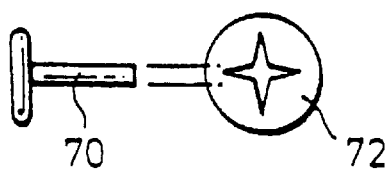
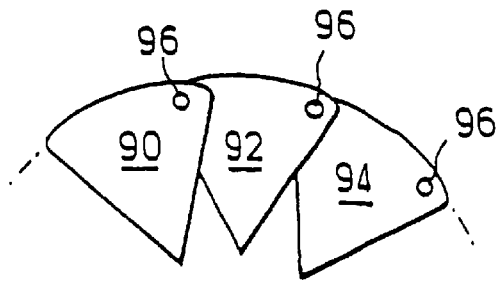

INSULATED ELECTRICAL EQUIPMENT

This invention relates to an insulating article for protecting electrical equipment and to such equipment having the article mounted thereon.

Electrical equipment, such as power transmission lines, insulators, surge arrestors, switchgear and transformers, operating at voltages in excess of 1 kV and particularly in excess of 10 kV (such voltages hereinafter being referred to as 'high voltage'), often have parts thereof or parts associated therewith that are not insulated from the surrounding air. Thus, an exposed portion of such equipment can be at high voltage and be longitudinally separated from another portion at low voltage, for example at earth potential. The exposed high voltage portion may be physically supported by an insulator, for example when an overhead power line is mounted on an insulator that spaces it from a supporting tower that is itself at earth potential, or for example when a high voltage cable is terminated at a bushing or switchgear whose metal housing is at earth potential. In such instances outdoors, the larger wildlife such as squirrels and birds with large wingspans may be big enough to form a direct bridge, ie. an electrical short circuit, between the high voltage equipment and earth potential, with serious, usually fatal, consequences for themselves and often with serious consequences for the electrical equipment and the supply of electrical power—usually at least a fuse is actuated or a circuit breaker triggered such that the power supply is interrupted.

One solution to this problem is to insulate the exposed parts of the high voltage equipment, at least in regions where a short circuit to earth is more likely to occur, for example unintentionally by wildlife, and products such as RAYSULATE insulation tapes and pre-shaped components are available from Raychem for this purpose. Such components include heat-recoverable polymeric sheds, which may be mounted on porcelain sheds of existing insulators so as to increase the creepage length thereof, or otherwise so as to improve electrical performance. Although such products may incidentally make it more difficult for wildlife to bridge the electrical terminals of an insulator, their design is not optimised for this purpose and their method of installation in some circumstances may not be particularly convenient.

Another solution is to mount an insulating guard on the apparatus so as physically to increase the distance between the two portions at such significantly different, ie. harmful, electrical potentials such that it is impossible, or at least more unlikely, that the wildlife will be able to form a direct bridge therebetween. A typical insulator for outdoor use may be made of porcelain or polymeric material and is usually provided with a plurality of rain sheds or skirts, that extend circumferentially around a central cylindrical core of the insulator and that are spaced apart along its length. A protective guard, referred to as a squirrel shield device, for preventing short-circuiting of such an insulator by wildlife is disclosed in WO 95/10844, the guard comprising two semi-circular discs that are brought together from each side of the insulator between two adjacent sheds. The semi-circular discs partially overlap and are interlocked, for example by means of projections on a face of one disc that engage apertures in the other disc. The diameter of the guard is typically about three times that of the sheds, and when in place provides an effective obstacle to wildlife prostrating themselves along the length of the shedded insulator from earth to high voltage. However, a guard of this configuration is not very convenient to position on the insulator, which may be difficult to access, as being mounted on top of a pole of about 4 m height for example. It is necessary to support the two halves separately, bring them together in overlapping relationship, and then to operate the interlocking mechanism. This usually cannot be done from a distance, from ground level for example, and the power supply to the electrical equipment, to the power line supported on the insulator for example, may have to be interrupted in order properly to fit the guard.

A generally disc-shaped polymeric insulating article for protecting electrical equipment such as a high voltage insulator is disclosed in WO 96/16416. This article is also in two parts, with a first part being substantially C-shaped to fit around the insulator core, and a second part comprising an insert that slidably engages the first part so as to secure the article in place.

It has been known for many years to mount additional barriers, sometimes referred to as booster sheds or creepage extenders, on to porcelain or polymeric insulators in order to improve their electrical performance. Such barriers are of generally circular or conical configuration and are to be mounted on the core of the insulator or on existing laterally-extending sheds thereof. It is advantageous for retrofitting such barriers on to insulators that are already connected into an electrical supply or distribution system, for them to be of wraparound configuration so as to avoid the need for any dismounting of the insulator. Thus, these barriers are annular and have a radial slit that is generally closed after positioning around the insulator. GB-A-1542845, WO 92/08237, and EP-A-0328365 exemplify articles of this kind. GB-A-1542845 discloses an annular discharge barrier of integral construction that is wrapped around the insulator and closed by having a series of pegs press fitted tightly into holes at overlapping edges. WO 92/08237 discloses an annular barrier that may be integral or that may be formed of a plurality of components connected together with discontinuities therebetween. Closure of this barrier may be by a rod extending through loops or by the peg and hole system of GB-A-1542845. The barrier of WO 92/08237, which although initially may be formed as a flat sheet, has to adopt a frusto-conical configuration when it is closed around an insulator by overlapping its free edges. EP-A-0328365 discloses a wraparound creepage extender whose free ends need not be connected together, but which may be secured by fasteners. Difficulties may be experienced with products having these features in securing them on to the underlying insulator, especially if that is still connected to a power source.

It is one object of the present invention to provide an article that can more conveniently be mounted on electrical equipment so as electrically to protect the equipment, and thus associated electrical components, from being short-circuited, for example due to the presence of wildlife.

Thus, in accordance with one aspect of the present invention, there is provided a substantially planar electrically insulating article for protecting electrical equipment that is of generally elongate configuration and that has two longitudinally spaced-apart portions that, in operation, are at significantly different electrical potentials, the article comprising:

(a) two substantially planar parts that are linked to each other at a pivot point such that relative rotation of the two parts about the pivot point causes the parts to move between an open condition and a closed condition of the article, wherein, in the open condition, the article can be applied to the elongate electrical equipment, and wherein, in the closed condition, the article encircles the equipment so as to extend generally transversely thereof; and (b) closure means arranged to secure the two parts of the article together when in the closed condition so as to retain the article securely mounted on the equipment.

The direct distance between the two portions at significantly different electrical potentials is the shortest distance between those portions that could be bridged by wildlife such as squirrels or large birds, and is typically about twelve to fourteen inches minimum.

The insulating article of the present invention is thus provided as a relatively rigid component that can be applied in an open condition to the electrical equipment effectively as a single article but whose parts can be rotated relative to one another about the pivot point to bring it to the closed condition so as conveniently to close it around and to secure it to the equipment. Furthermore, and unlike the barrier sheds discussed above, the pivotal movement of the two parts ensures that the article of the invention retains its planar configuration as it moves from its open condition to its closed condition. Thus, for any given lateral, usually radial, dimension in the open configuration, an article in accordance with the present invention will allow its lateral dimension in the closed configuration to be maximised. This is an important feature for the application of wildlife protection, but is not so relevant for known articles that are designed purely for improving the continuous electrical performance of the insulator, for example by their ability, having a generally conical configuration, to shed water away from the insulator.

When the article is applied to the electrical equipment, it may initially be disposed loosely therearound and be supported thereby. In the closed condition, it may abut, and may be secured to, the encircled equipment. It is envisaged, however, that even in the closed condition, in which the article can no longer simply be displaced off the equipment, the article may be a loose fit, for example as by being rotatable, on the equipment.

Preferably the two parts of the article overlap each other in the closed condition of the article, and the closure means extends through an aperture in at least one part in the overlapping region.

The closure means may comprise means extending through the or each aperture arranged to tie the two parts of the article together. Insulating thread or tape may be used, but a tie-wrap polymeric member that is self-locking is preferred.

In another embodiment, the two parts of the article may be closed by means of a wedge that drives the parts together around the insulator. Advantageously, the wedge is substantially co-planar with the article, and may interengage therewith by means of a ratchet mechanism.

In other embodiments, the closure means may comprise a pin, or bolt or projection, and may be secured to one of the parts and arranged to co-operate with the other part in a manner so as to secure the two together. For example, the pin may have an enlarged head at its free end and may co-operate with a keyhole-shaped slot in the other part. In this embodiment, the pinhead enters the slot at its larger-apertured end, and slides therealong so as to be retained therein and simultaneously to secure the two parts of the article together. In another embodiment, the free end and shank of the pin may pass into an aperture of the other member that is ratcheted, for example by having a suitably shaped inner periphery, so as to grip the pin and to resist its withdrawal from the aperture. The inner periphery may be star-shaped for example or may be slitted. It is also envisaged, however, that the aperture may be of slightly smaller size than the pin to effect its securement.

In a further embodiment, one or both of the parts may have a channel, or groove or slot, in its outer periphery, by means of which the parts may be tied together. For example, a tie-wrap or other tying member may extend around channels in the two parts so as to pull them securely around the electrical equipment. Alternatively, the tying member may be retained in or on one of the parts, for example as by passing through an aperture therein, and may engage a channel in the other part.

In a still further embodiment, a pin of the closure means may be retained in or on one of the parts, its free end extending through an aperture in the other part. The pin may be threaded, and may thus comprise a bolt, and a co-operatively-threaded nut may be employed to secure it in place.

It is also envisaged that the closure means may be integrally formed with the article, such as, for example, the parts thereof snap-fitting together.

Usually, the electrical equipment on which the article of the invention is mounted is of generally circular cross-section, and its diameter may be within a predetermined range depending, for example, on its voltage rating. It is advantageous therefore if a single insulating article can be provided that has a range-taking ability so that it can be used with differently-sized pieces of electrical equipment. Range-taking, whilst maintaining the ability to achieve secure retention of the article on the equipment, can be enhanced if the central aperture fully defined by the two parts of the article is delineated by one, or preferably a pair, of substantially U- or V-shaped surfaces; for example one such surface being provided by each of the parts of the article. The extent of interengagement of the two parts, such as the extent to which the parts are able to close around the electrical equipment, will then vary depending on the diameter, or other transverse dimension, of the electrical equipment. Preferably at least one of the parts, and advantageously each of them, is provided with at least one aperture adjacent its inner periphery such that the article is arranged, in operation, to engage the electrical equipment resiliently, thus further enhancing the range-taking ability.

For ease and cheapness of manufacture, the two parts of the article are advantageously of the same size and shape.

Usually, the article will be of circular shape, and preferably planar, in the form of a disc. The pivot point will usually be adjacent the outer periphery, and the closure of the two parts will be located diametrically opposed thereto.

Although the article of the invention, in keeping with the equipment on which it is mounted, is generally of substantially circular shape, it will be appreciated that the object of avoiding formation of a direct bridge over a relatively short path length between two parts of electrical equipment at significantly different electrical potentials, may be achieved by a laterally-extending insulating article of different shape, and reference to 'disc-shape' is to be interpreted accordingly.

The two parts that form the protective surface area of the article may be substantially identical, or they may be complementarily—shaped with respect to each other, but this need not necessarily be so.

In accordance with another aspect of the present invention there is provided a substantially planar electrically insulating article for protecting electrical equipment that is of generally elongate configuration and that has two longitudinally spaced apart portions that, in operation, are at significantly different electrical potentials, the article comprising:

(a) at least three substantially planar parts that are sequentially linked together at pivot points such that relative rotation of the parts about the pivot points causes the parts to move between an open condition and a closed condition of the article, wherein, in the open condition, the article can be applied to the elongate electrical equipment, and wherein, in the closed condition, the article encircles the equipment and so as to extend generally transversely thereof; and (b) closure means arranged to secure together the two extreme ones of the plurality of parts of the article when in the closed condition so as to retain the article securely mounted on the equipment.

Each part and the closure means of the article of this other aspect of the invention may be as hereinbefore and hereinafter described.

Advantageously the insulating article of the invention, and preferably both parts thereof, is formed from polymeric material such as polyethylene, EPDM or silicone, which preferably is also substantially electrically non-tracking as defined in ASTM D2303. The use of such high electrical quality materials allows articles mounted on insulators of adjacent pieces of electrical equipment, for example uninsulated overhead power lines, to come into close proximity, for example overlap, with each other, or even to touch, without any significant deterioration in the electrical performance.

In yet another aspect of the present invention, there is provided electrical equipment, for example an electrical insulator or power cable termination, having mounted thereon at least one substantially planar electrically insulating article in accordance with the invention as hereinbefore described.

In cases where the equipment is fitted with laterally-extending rain sheds, the insulating article of the present invention will usually extend laterally a significantly further distance from the core of the equipment. For example, the insulating guard article may be generally circular and have a diameter twice or even three, or more, times that of the rain shed associated with the equipment, and four, five or more times that of a cylindrical core of the equipment—when the equipment comprises a shedded insulator for example. Furthermore, the rain shed or sheds may be of frusto-conical configuration angled generally downwards, with the insulating article of the invention extending substantially at right angles to a longitudinal, for example vertical, axis of the equipment.

The equipment may be orientated substantially vertically, substantially horizontally, or at any other angle.

Advantageously, one, and preferably both parts of the article of the invention are apertured such that any equipment or apparatus that is mounted beyond, for example above or behind, the article is visible therethrough.

The electrical equipment may comprise, for example, a stand alone insulator, or the insulator may function as an insulating bushing of switchgear or a transformer. The insulating function may also be combined with another function, such as by the equipment comprising a fuse, a circuit breaker or a surge arrestor.

One particular advantage of the article of the invention is that it can be installed relatively easily, and can be done so 'live', that is to say without having to switch off the power to the associated electrical equipment, an overhead power line for example. In this way, much time and money can be saved by avoiding the need for carrying out earthing and other safety procedures, and for supplying customers temporarily with electrical power by another route.

Several embodiments of insulating wildlife guard and electrical equipment protecting article, and electrical equipment protected by the article, in accordance with the present invention, will now be described, by way of example, with reference to the accompanying drawings in which:

FIG. 2 is a plan view of one embodiment of the article of the invention;

FIG. 4 shows another embodiment of a closure means;

FIG. 5 shows a portion of a further embodiment of insulating guard; and

Figure 1:
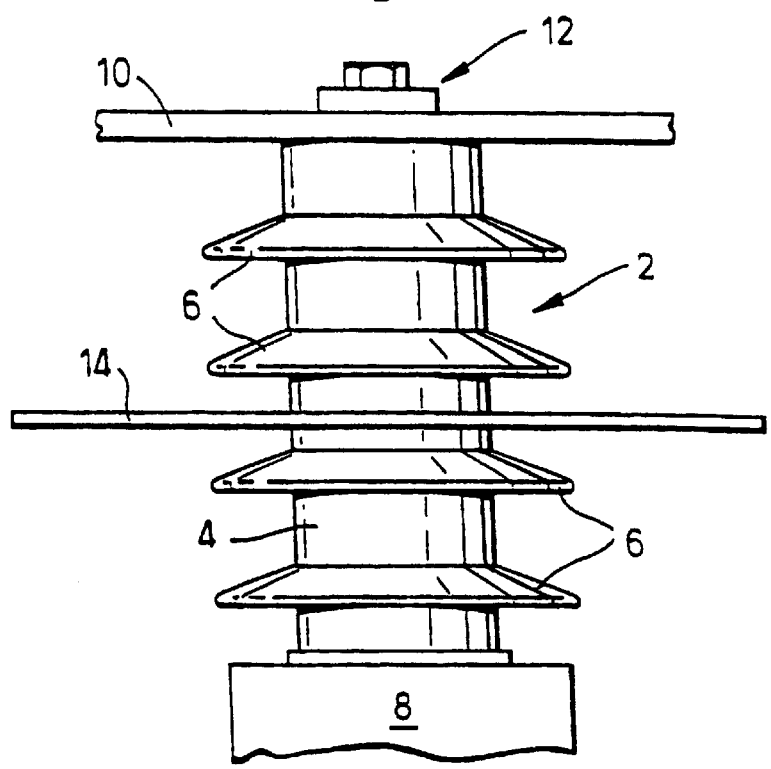
FIG. 1 is a schematic elevation of a high voltage insulator fitted with the insulating article.

Referring to FIG. 1, an elongate high voltage insulator 2 for outdoor use is made of porcelain and comprises a generally cylindrical core 4 of approximate diameter 12 cms (4½ inches) and four longitudinally spaced apart rain sheds 6 of approximate diameter 20 cms (eight inches) integral therewith. The insulator 2 is mounted vertically on an earthed metal base 8, and supports an uninsulated high voltage conductor 10 by being bolted thereto at 12. The shortest direct distance between the earthed plinth 8 and the conductor 10 at high voltage, is approximately 50 cms (20 inches), a distance that can be bridged by certain forms of wildlife. To safeguard such wildlife and also the continuity of supply of electrical power along the conductor 10, a generally circular disc-shaped polymeric insulating guard 14 of diameter twenty four inches is mounted on the insulator 2. The guard 14 is fixed to the core 4 of the insulator 2 about halfway along its length. With the guard 14 in position on the insulator 2, the direct distance between earth and high voltage is significantly increased.

One embodiment of the insulating guard is shown at 20 in FIG. 2, and comprises two planar arcuate parts 24, 26. The parts 24, 26 are shown partially open. The parts are mounted on a swivel hinge 28 where they overlap. The closure arrangement comprises a pin 30 loosely retained in a slot 32 of the part 24 at a location diametrically opposed to the hinge 28, and a keyhole-shaped slot 34 of the part 26 also located diametrically opposite the hinge 28. Upon swivelling the parts 24, 26 to bring article 20 to a closed condition, the enlarged head 36 of the pin 30 is located adjacent the larger-apertured end 38 of the slot 34, is urged therethrough, and is subsequently urged along the shank, or narrow portion, of the slot 34 as the two parts 24, 26 are brought into engagement with the electrical equipment (not shown) extending therethrough. In a more preferred embodiment, the elongate slot 32 is dispensed with, the pin 30 merely passing as an easy fit through a correspondingly-shaped aperture in the guard part 24, with range-taking of the assembled guard being accommodated substantially solely by the keyhole-shaped slot 34 of the part 26.

The pin 30 of the embodiment of FIG. 2 may be replaced by a bolt, which may be captured in the part 24, that may tighten the parts 24 and 26 of the guard together by means of a co-operating nut.

The central region 40 of each part 24, 26 is cut away to define a U-shape such that different sizes, eg. diameters, of equipment can be located within the same article by varying the extent of the closing of the parts. An elongate aperture 42 is provided in the parts 24, 26 adjacent each limb of the central region. The apertures 42, in association with the resilience of the polymeric material from which the article 20 is made, allow for a certain amount of compressibility and thus enhance the range-taking capability of the insulating guard.

Each article part 24, 26 is punctured by circular apertures 44 lover the major area of its surface to allow visibility through the otherwise opaque article.

Figure 3:
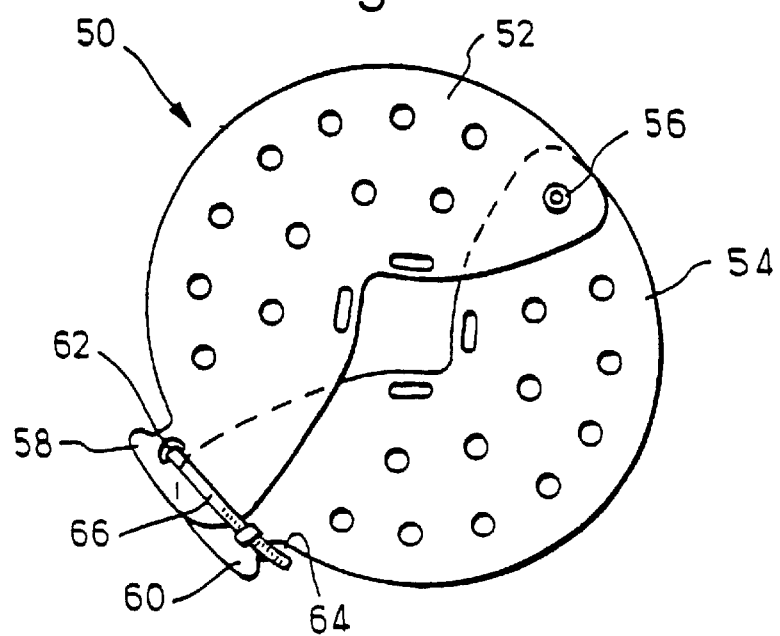
FIG. 3 is a plan view of another embodiment of the article of the invention.

The embodiment 50 of insulating guard shown in FIG. 3 differs from the guard 20 of FIG. 2 in its closure mechanism. The two parts 52, 54 of the guard 50 are substantially identical, and at their periphery remote from the pivot point 56 have a circumferential extension 58, 60 that provides an aperture 62 therethrough and a channel 64. A polymeric tie-wrap 66 is retained in the aperture 62 of the part 52. When the two parts 52, 54 are closed around the centrally-located piece of electrical equipment (not shown), the still-open tie-wrap 66 is looped through the channel 64 of the other part 54, and secured so as to pull the central region of the guard 50 tightly into engagement with the equipment.

FIG. 4 shows a modification of the closure arrangement, for use with an insulating guard having an aperture in at least one of the parts in the region where they overlap in the closed condition.

The closure arrangement comprises a pin 70 (shown in side view) having an enlarged head and a cylindrical shank, and a retaining washer 72 (shown in end view). The washer 72 has an irregular, ie. non-smooth, inner periphery, for example being of star shape, that receives the shank of the pin 70 as a push-fit therein, but subsequently resists withdrawal of the pin. The pin 70 is passed through overlapping apertures of the two parts of the insulating guard when the guard is in firm abutment with the electrical equipment, and the washer 72 is fitted, thereby to hold the two parts firmly in position.

FIG. 5 shows schematically a portion of an insulating guard that comprises a plurality of parts, only three of which 90, 92, 94 being shown, that together completely encircle the electrical equipment. Each part is hinged at 96 to each of its neighbours, and on closing around the equipment a closure arrangement of suitable form secures all the parts on the equipment.

Figure 6:
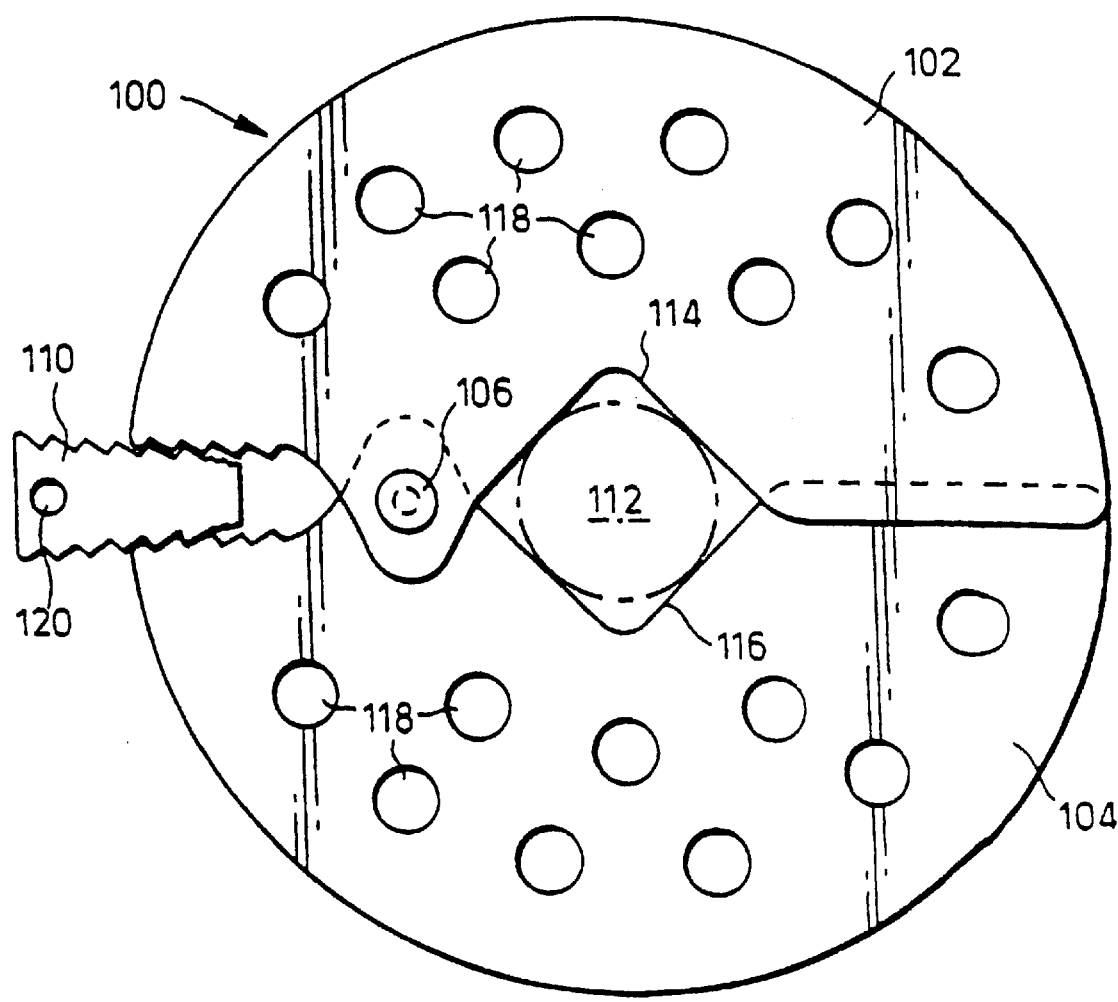
FIG. 6 shows a plan view of a yet further embodiment of the article.

The insulating guard 100 shown in FIG. 6 has two substantially planar and substantially semi-circular major portions 102, 104 interconnected by a hinge pin 106 located approximately midway along a radius of the guard. The portions 102, 104 have a slot 108 therebetween in the region beyond the pin 106 and the adjacent periphery. Opposing edges of the components along the slots 108 are of toothed configuration, and are engageable by a mating wedge 110.

The guard 100 is shown in the closed position, with the wedge 110 inserted in ratchet engagement with the slot 108 so as to bring the two guard portions 102, 104 into contact with a centrally-located insulator core 112. The central V-shaped cut-outs 114, 116 in the portions 102, 104 respectively allow for range-taking such that the guard 100 can fit on to insulators 112 of a variety of diameters. The portions 102, 104 are apertured at 118, for visibility through the article, and also to allow the article to be gripped by a tool to allow it to be positioned on the insulator 112. The locking wedge 110 also has an aperture 120 to allow it to be gripped for insertion into the slot 108.

Although in the embodiments disclosed, the insulating guards usually contact the supporting insulator when in the closed condition, this need not be so. In some instances it may be sufficient for the guard to be retained loosely around the core, and to be supported by resting on a lateral shed of the insulator.

It is envisaged that any combination of parts and closure arrangements disclosed herein that will produce a functional insulator guard, may be selected.

What is claimed is:

1. A substantially planar electrically insulating article for protecting elongate electrical equipment, the electrical equipment having two longitudinally spaced-apart portions that, in operation, are at different electrical potentials, the article comprising:

two substantially planar parts connected to each other at a pivot point such that relative rotation of the two parts about the pivot point causes the parts to move between an open condition and a closed condition of the article, wherein, in the open condition, the article can be applied to the electrical equipment, and wherein, in the closed condition, the article encircles the electrical equipment so as to be retained thereon and to extend generally transversely thereof; and a pin with an enlarged head secured to one of the parts and a keyhole-shaped aperture in the other part, wherein the enlarged head of the pin is insertable into a wider portion of the keyhole aperture and is slideable therealong into a narrower portion and securable therein so as to secure the two parts of the article together in the closed condition around the electrical equipment.

2. A substantially planar electrically insulating article for protecting elongate electrical equipment, the electrical equipment having two longitudinally spaced-apart portions that, in operation, are at different electrical potentials, the article comprising:

two substantially planar parts connected to each other at a pivot point such that relative rotation of the two parts about the pivot point causes the parts to move between an open condition and a closed condition of the article, wherein, in the open condition, the article can be applied to the electrical equipment, and wherein, in the closed condition, the article encircles the electrical equipment so as to be retained thereon and to extend generally transversely thereof, each of the parts having an inner periphery and an outer periphery;

a retaining channel in the outer periphery of a first one of the parts configured to receive and retain a tie wrap so as to enable the first part to be tied to the other part; and a second retaining channel in the outer periphery of the other part, offset from the retaining channel of the first one of the parts in the closed condition, configured to receive and retain the tie wrap so as to enable the two parts to be tied together or an aperture in the outer periphery of the other part, offset from the retaining channel of the first one of the parts in the closed condition, configured to receive and retain the tie wrap so as to enable the two parts to be tied together.

3. An article according to claim 1 wherein the inner periphery of each part of the article is of substantially U- or V-shape so as, in operation, to abut the electrical equipment extending therethrough and to accommodate such equipment having a range of cross-sectional dimensions.

4. A substantially planar electrically insulating article for protecting elongate electrical equipment, the electrical equipment having two longitudinally spaced-apart portions, that in operation, are at different electrical potentials, the article comprising:

two substantially planar parts connected to each other at a pivot point such that relative rotation of the two parts about the pivot point causes the parts to move between an open condition and a closed condition of the article, wherein, in the open condition, the article can be applied to the electrical equipment, and wherein, in the closed condition, the article encircles the electrical equipment so as to he retained thereon and to extend generally transversely thereof, each of the parts having an inner periphery and an outer periphery;

closure means arranged to secure the two parts of the article together when in the closed condition; and wherein at least one of the two parts is provided with at least one elongate aperture adjacent its inner periphery, the at least one elongate aperture being positioned to increase the articles range-taking, such that the article is arranged, in operation, resiliently to engage the electrical equipment extending therethrough.

5. An article according to claim 4, wherein the two parts thereof are of substantially the same shape and size.

6. An article according to claim 4, being of substantially disc shape in its closed condition.

7. An article according to claim 4, wherein the pivot point is located adjacent the outer periphery of the article and the closure means is located at a corresponding point opposed thereto adjacent the outer periphery.

8. A substantially planar electrically insulating article for protecting electrical equipment that is of generally elongate configuration and that has two longitudinally spaced apart portions that, in operation, are at significantly different electrical potentials, the article comprising:

(a) at least three substantially planar parts that are sequentially linked together at pivot points such that relative rotation of the parts about the pivot points causes the parts to move between an open condition and a closed condition of the article, wherein, in the open condition, the article can be applied to the elongate electrical equipment, and wherein, in the closed condition, the article encircles the equipment and extend generally transversely thereof; and (b) closure means arranged to secure together the two extreme ones of the plurality of parts of the article when in the closed condition so as to retain the article securely mounted on the equipment.

9. An article according to claim 8, made from a material comprising electrically insulating and substantially electrically non-tracking polymeric material.

10. An article according to claim 8, wherein the pivot point and the closure means are arranged to be located on opposite sides of the elongate electrical equipment.

11. An article according to claim 8, wherein the pivot point and the closure means are arranged to be located on the same side of the elongate electrical equipment, and wherein the closure means comprises a wedge that interacts with the two planar parts of the article.

12. An article according to claim 11, wherein the wedge and the planar parts are substantially co-planar and interengage by means of a ratchet mechanism.

13. An article according to claim 8, wherein at least one of the parts thereof is apertured, whereby any equipment mounted therebeyond is visible therethrough.

14. Electrical equipment that is of generally elongate configuration and that has two longitudinally spaced-apart portions that, in operation, are at significantly different electrical potentials, and that has mounted thereon intermediate said spaced-apart portions at least one article according to claim 8.

15. Electrical equipment according to claim 14, having a generally cylindrical core extending through the or each article, with the or each article extending transversely to the axis of the core.

16. Electrical equipment according to claim 14 comprising an elongate core and at least one rain shed extending laterally therefrom, wherein said at least one article extends laterally from the core by an amount greater than the lateral extension of the rain shed.

17. Electrical equipment according to claim 16, wherein said at least one article is mounted on said at least one rain shed.

18. Electrical equipment according to claim 14, comprising an electrical insulator, a bushing of switchgear or a transformer, or a surge arrester.

19. A substantially planar electrically insulating article for protecting elongate electrical equipment, the electrical equipment having two longitudinally spaced-apart portions that, in operation, are at different electrical potentials, the article comprising:

two substantially planar parts connected to each other at a pivot point such that relative rotation of the two parts about the pivot point causes the parts to move between an open condition and a closed condition of the article, wherein, in the open condition, the article can be applied to the electrical equipment, and wherein, in the closed condition, the article encircles the electrical equipment so as to be retained thereon and to extend generally transversely thereof;

a wedge receiving cutout in at least one of the parts, the pivot point and the wedge receiving cutout being located on the same side of the elongate electrical equipment when the article encircles the electrical equipment; and a wedge configured to be positioned in the wedge receiving cutout to secure the two parts of the article together when in the closed position.

20. An article according to claim 19 wherein the wedge and the planar parts are substantially co-planar and interengage at a ratchet mechanism defined by an edge of the wedge receiving cutout.

* * * * *